US008009668B2

(12) United States Patent
Bare et al.

(10) Patent No.: US 8,009,668 B2
(45) Date of Patent: Aug. 30, 2011

(54) METHOD AND APPARATUS FOR ROUTER AGGREGATION

(75) Inventors: Ballard Claude Bare, Auburn, CA (US); Shaun Kazuo Wakumoto, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1613 days.

(21) Appl. No.: 10/919,760

(22) Filed: Aug. 17, 2004

(65) Prior Publication Data

US 2006/0039385 A1      Feb. 23, 2006

(51) Int. Cl.
*H04L 12/28* (2006.01)

(52) U.S. Cl. .................... 370/389; 370/397; 370/401

(58) Field of Classification Search .................. 370/389, 370/397, 400, 401; 709/225, 241
See application file for complete search history.

(56) References Cited

U.S. PATENT DOCUMENTS

| | | | | |
|---|---|---|---|---|
| 5,548,649 A * | 8/1996 | Jacobson | ...................... | 713/153 |
| 5,920,699 A * | 7/1999 | Bare | ............... | 709/225 |
| 5,963,541 A | 10/1999 | Bhaskaran | | |
| 6,023,563 A * | 2/2000 | Shani | ............... | 709/249 |
| 6,125,114 A * | 9/2000 | Blanc et al. | ............... | 370/389 |
| 6,266,335 B1 | 7/2001 | Bhaskaran | | |
| 6,345,051 B1 * | 2/2002 | Gupta et al. | ............... | 370/395.2 |
| 6,393,484 B1 * | 5/2002 | Massarani | ............... | 709/227 |
| 6,397,260 B1 | 5/2002 | Wils et al. | | |
| 6,493,318 B1 | 12/2002 | Bare | | |
| 6,556,547 B1 | 4/2003 | Srikanth et al. | | |
| 6,556,575 B1 * | 4/2003 | Denio et al. | ............... | 370/401 |
| 6,577,600 B1 | 6/2003 | Bare | | |
| 6,580,715 B1 | 6/2003 | Bare | | |
| 6,606,300 B1 * | 8/2003 | Blanc et al. | ............... | 370/229 |
| 6,618,388 B2 * | 9/2003 | Yip et al. | ............... | 370/401 |
| 6,618,398 B1 * | 9/2003 | Marchetti et al. | ............. | 370/475 |
| 6,640,251 B1 * | 10/2003 | Wiget et al. | ................... | 709/238 |
| 6,657,974 B1 | 12/2003 | Britton et al. | | |
| 6,754,220 B1 | 6/2004 | Lamberton et al. | | |
| 6,771,673 B1 * | 8/2004 | Baum et al. | ................... | 370/535 |
| 6,876,654 B1 * | 4/2005 | Hegde | ........................ | 370/392 |
| 6,970,471 B1 * | 11/2005 | Yeh et al. | ................... | 370/395.52 |
| 7,055,151 B1 * | 5/2006 | Joffe et al. | ................... | 718/104 |
| 7,075,933 B2 * | 7/2006 | Aysan | .................. | 370/395.31 |
| 7,136,374 B1 * | 11/2006 | Kompella | ................... | 370/352 |
| 7,248,577 B2 * | 7/2007 | Hakusui | ................... | 370/352 |
| 7,254,834 B2 * | 8/2007 | Goddard | ................... | 726/11 |
| 7,362,752 B1 * | 4/2008 | Kastenholz | ................... | 370/389 |
| 7,376,089 B2 * | 5/2008 | Wakumoto et al. | ........... | 370/254 |
| 7,447,901 B1 * | 11/2008 | Sullenberger et al. | ........ | 713/153 |
| 7,468,956 B1 * | 12/2008 | Leelanivas et al. | ............ | 370/255 |
| 2003/0174706 A1 * | 9/2003 | Shankar et al. | ............... | 370/393 |
| 2004/0165600 A1 * | 8/2004 | Lee | ............... | 370/395.53 |
| 2004/0174887 A1 * | 9/2004 | Lee | ............... | 370/395.53 |

OTHER PUBLICATIONS

Chiruvolu et al., "Issues and Approaches on Extending Ethernet Beyond LANs", IEEE Communications Magazine, Mar. 2004, p. 80-86; hereafter Chiruvolu.*

* cited by examiner

*Primary Examiner* — Dang T Ton
*Assistant Examiner* — Brian O'Connor

(57) ABSTRACT

One embodiment disclosed relates to a method of routing a packet by way of a router aggregation. A packet is received from outside the aggregation by an initially receiving router/switch unit. Router functions are performed by the initially receiving router unit, including modification of the packet. The packet is then sent to a layer 2 network of the aggregation, wherein switching functions are performed on the packet. Another embodiment disclosed relates to a cooperative aggregation of router/switch units. The aggregation includes a plurality of the router/switch units, and a switching network interconnecting the units. The cooperative aggregation functions as a single router from a perspective of an external network device coupled to the system.

19 Claims, 9 Drawing Sheets

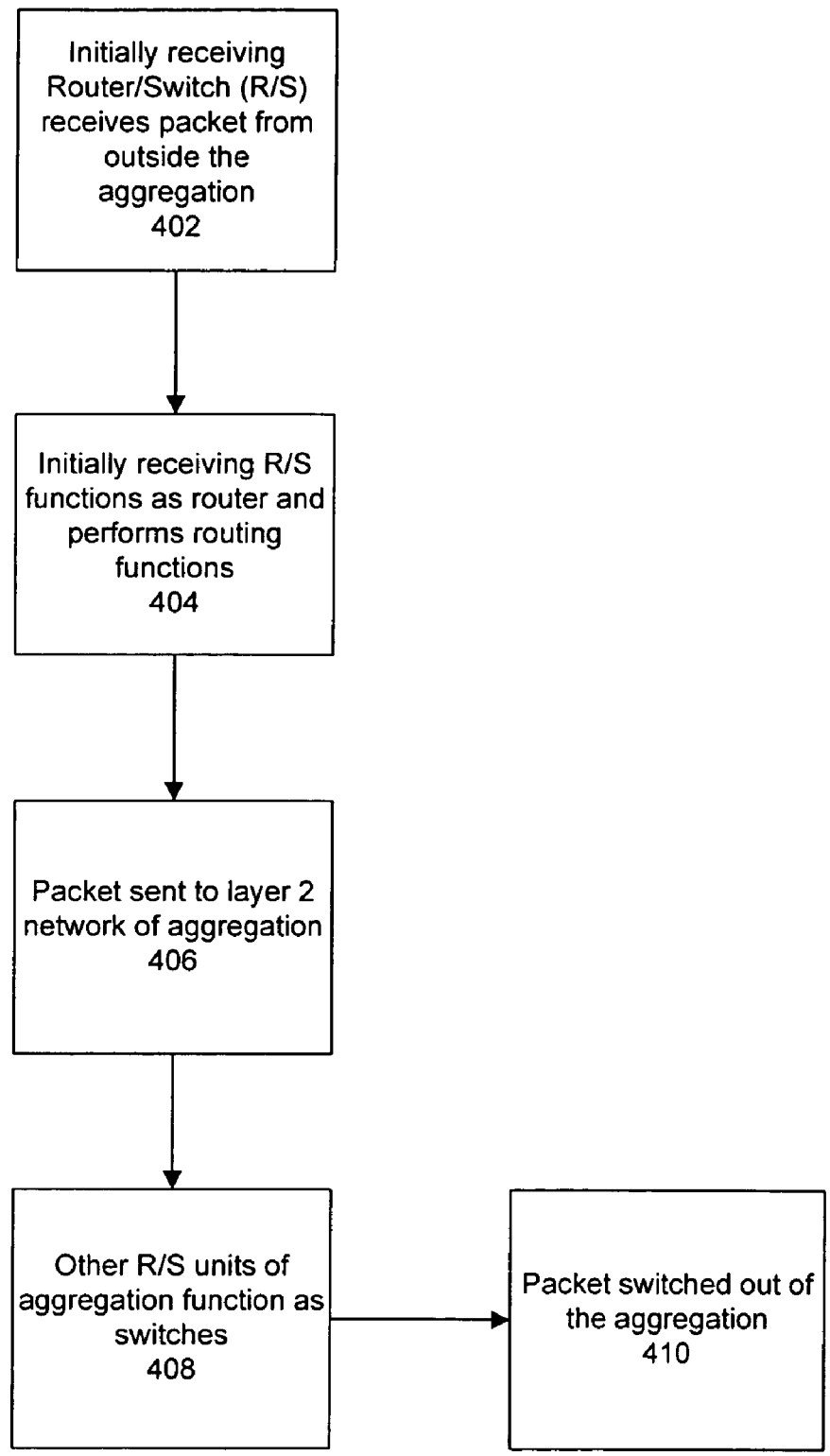
FIG. 4      400

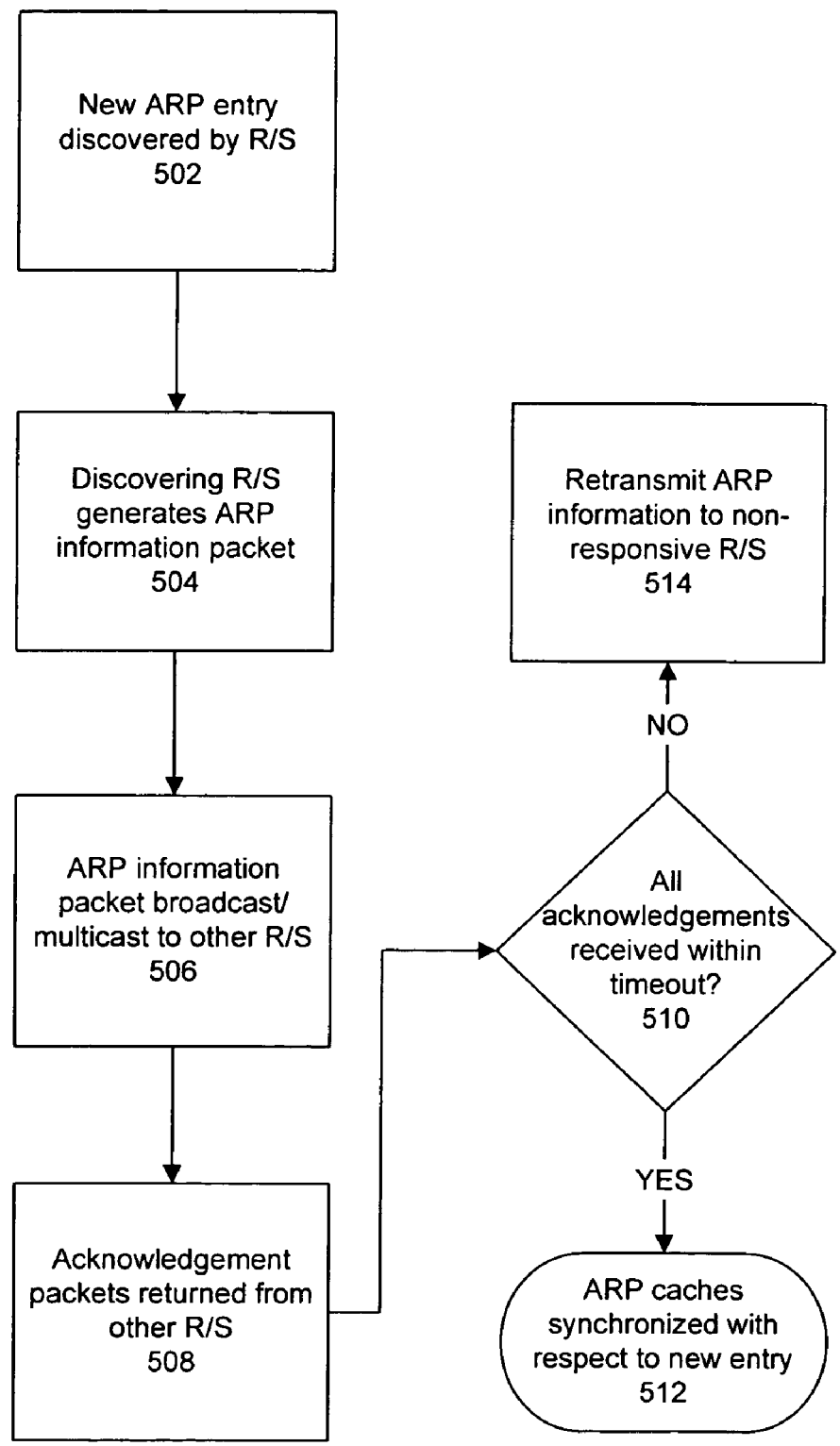
FIG. 5          500

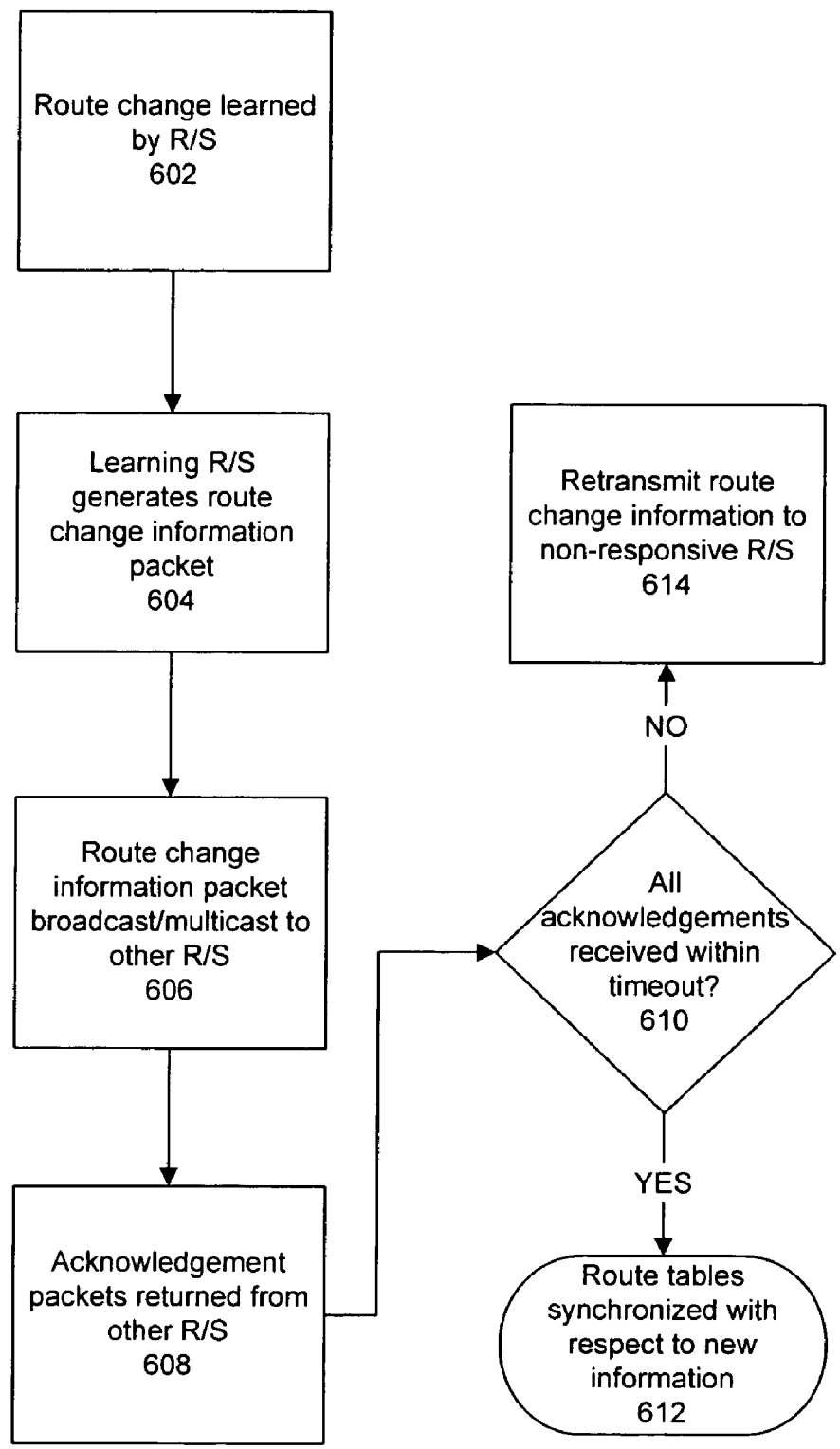
FIG. 6        600

METHOD AND APPARATUS FOR ROUTER AGGREGATION

BACKGROUND OF THE INVENTION

1. Field of the Invention

The present invention relates generally to communication networks. More specifically, the present invention relates to network routers and switches.

2. Description of the Background Art

Computer networks are widely used to provide increased computing power, sharing of resources and communication between users. Networks may include a number of computer devices within a room, building or site that are connected by a high-speed local data link such as Ethernet, token ring, or the like. Local area networks (LANs) in different locations may be interconnected to form a wide area network (WAN).

The Internet is an interconnected set of networks, wherein each of the constituent networks retains its identity, and special mechanisms are needed for communication across multiple networks. The constituent networks are referred to as subnetworks.

Each subnetwork in the Internet supports communication among the devices connected to that subnetwork. Routers are specialized computing devices that are typically used to connect two subnetworks that may or may not be similar. A router typically employs internet protocol (IP) to allow communication between hosts and routers through the routers present in the internet protocol network. IP provides a connectionless or datagram service between stations.

Routers generally use routing tables to direct packet traffic over a network. Routing tables have multiple entries, or routes, each route routes traffic to a single subnet. A subnet is identified by its network address and its width or network mask. Each route specifies forwarding information for the set of hosts that fall within that route's subnet. Each subnet may be further divided into smaller subnets. These subnets may be routed to using routes specific to the subdivided subnets, or there may be just one route that is used to route to a set of subnets contained within a larger subnet.

For example, in the Internet context, each entry consists of the 32-bit network (Internet Protocol) address such as "192.56.7.48" and a width, or prefix length, such as 8, 16, or 24 (these are not exclusive, the width may be any number from 0 to the number of bits in the address.) The width specifies how many bits a router should consider when comparing a destination to a route for the purpose of determining if that IP address falls within (or "matches" or "is contained by") the route. For instance, if the route has a network address of "192.56.7.48" and a width of "16", the router need only consider the first two bytes to determine if a particular IP address matches the route (in other words, falls within the subnet specified for the route) and may effectively read the network address as "192.56.0.0".

Associated with each entry in the routing table is forwarding information. In some implementations, the forwarding information may comprise a "next hop" value that indexes into a second table. The second or "next hop" table is used to map layer 3 addresses to layer 2 forwarding information of adjacent routers and hosts. For instance, the IP address "192.56.7.48/16" may have an associated next hop value of "17", meaning that the IP address and the layer 2 forwarding information for either the next hop router or for the host itself if the host is directly connected is at location 17 in the next hop table.

The router uses the routing table to select the path to use when routing a packet through the network. When a packet arrives at a router, the router first finds the route in the routing table that provides the best match to the destination address. Many routing systems use best match prefix for route selection. This rule dictates that the route that best matches the destination of a packet is the route to use for routing the packet. Using best match prefix, the route that "best" matches the packet is the route with the longest prefix and whose subnet contains the destination address. Packets are forwarded using the forwarding information associated with the route that best matches the destination address from the packet.

It is highly desirable to improve performance of routers and of networks in general. Conventionally, in order to increase router performance, either a very large (i.e. high performance) must be used, or multiple smaller (i.e. lower performance) routers may be interconnected together using routing protocols.

FIG. 1 is a schematic diagram depicting a conventional configuration 100 where multiple routers interconnected via routing protocols. In the example illustrated, three routers 102 are interconnected by way of a layer 3 network 104. In other words, the routers 102 utilize layer 3 routing protocols to communicate data packets between each other.

SUMMARY

One embodiment of the invention relates to a method of routing a packet by way of a router aggregation. A packet is received from outside the aggregation by an initially receiving router/switch unit. Router functions are performed by the initially receiving router unit, including modification of the packet. The packet is then sent to a layer 2 network of the aggregation, wherein switching functions are performed on the packet.

Another embodiment of the invention relates to a cooperative aggregation of router/switch units. The aggregation includes a plurality of the router/switch units, and a switching network interconnecting the units. The cooperative aggregation functions as a single router from a perspective of an external network device coupled to the system.

BRIEF DESCRIPTION OF THE DRAWINGS

FIG. 4 is a flow chart depicting a method of routing by a router aggregation in accordance with an embodiment of the invention.

FIG. 5 is a flow chart depicting a method of propagating ARP information among R/S units in a router aggregation in accordance with an embodiment of the invention.

FIG. 6 is a flow chart depicting a method of propagating route information among R/S units in a router aggregation in accordance with an embodiment of the invention.

DETAILED DESCRIPTION

Problems with Conventional Techniques

The conventional techniques for increasing router performance have various problems and disadvantages. First, using a large (high-performance) "core" router is very expensive and disadvantageously co-locates routing resources. The co-location of routing resources at a single high-performance router increases the vulnerability to failure from power loss, physical damage, and so on. Second, using multiple smaller routers interconnected via routing protocols also has disadvantages. In particular, there is substantially increased overhead in that each router hop must perform all the router functionality. This functionality includes looking "deeper" into the packet for the destination IP address, looking up the destination IP address in a routing table, and modifying the packet before sending it.

Advantages of Embodiments of the Present Invention

Embodiments of the present invention are described herein that provide for improved routing performance without many or all of the disadvantages of the conventional techniques.

First, in comparison to a single large router, an "aggregated" router, as disclosed herein, can be spread across a much larger geographic area and provide more robust up-time and security. Loss of a single large router would result in losing all the many routing ports on that large router, while loss of one of the aggregated routers would result in losing only those ports connected to that router, while the remainder of the aggregated routers still function. Furthermore, an aggregation of routers provides greater scalability and may be typically less expensive than a single large router.

Second, in comparison to smaller routers connected via routing protocols, an "aggregated" router, as disclosed herein, can substantially reduce routing overhead. The router look-up may be performed once at the edge of the aggregated router topology and then the packet may be efficiently switched using layer 2 switching techniques after that. The layer 2 switching is more efficient than layer 3 routing because the layer 2 switching is less complex and requires less overhead.

Example Router Aggregation

Figure 1:
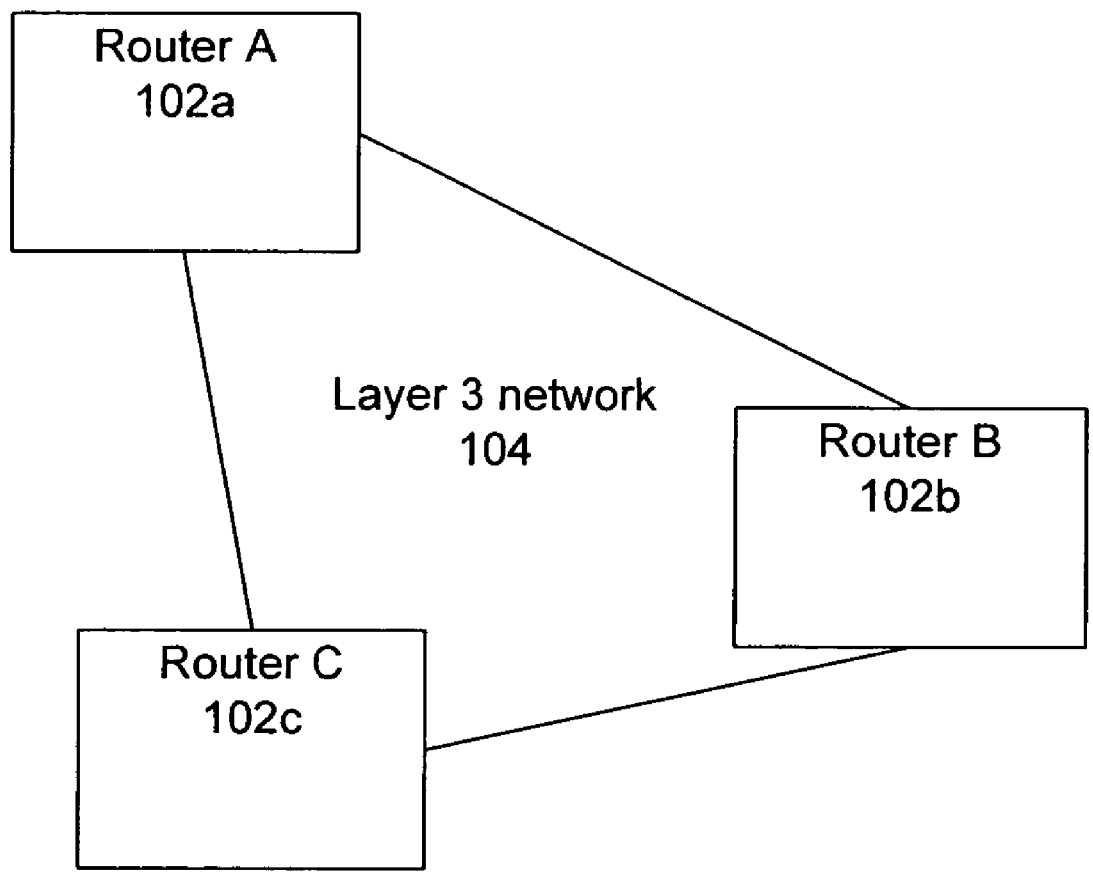
FIG. 1 is a schematic diagram depicting a conventional configuration where multiple routers interconnected via routing protocols.
Figure 2:
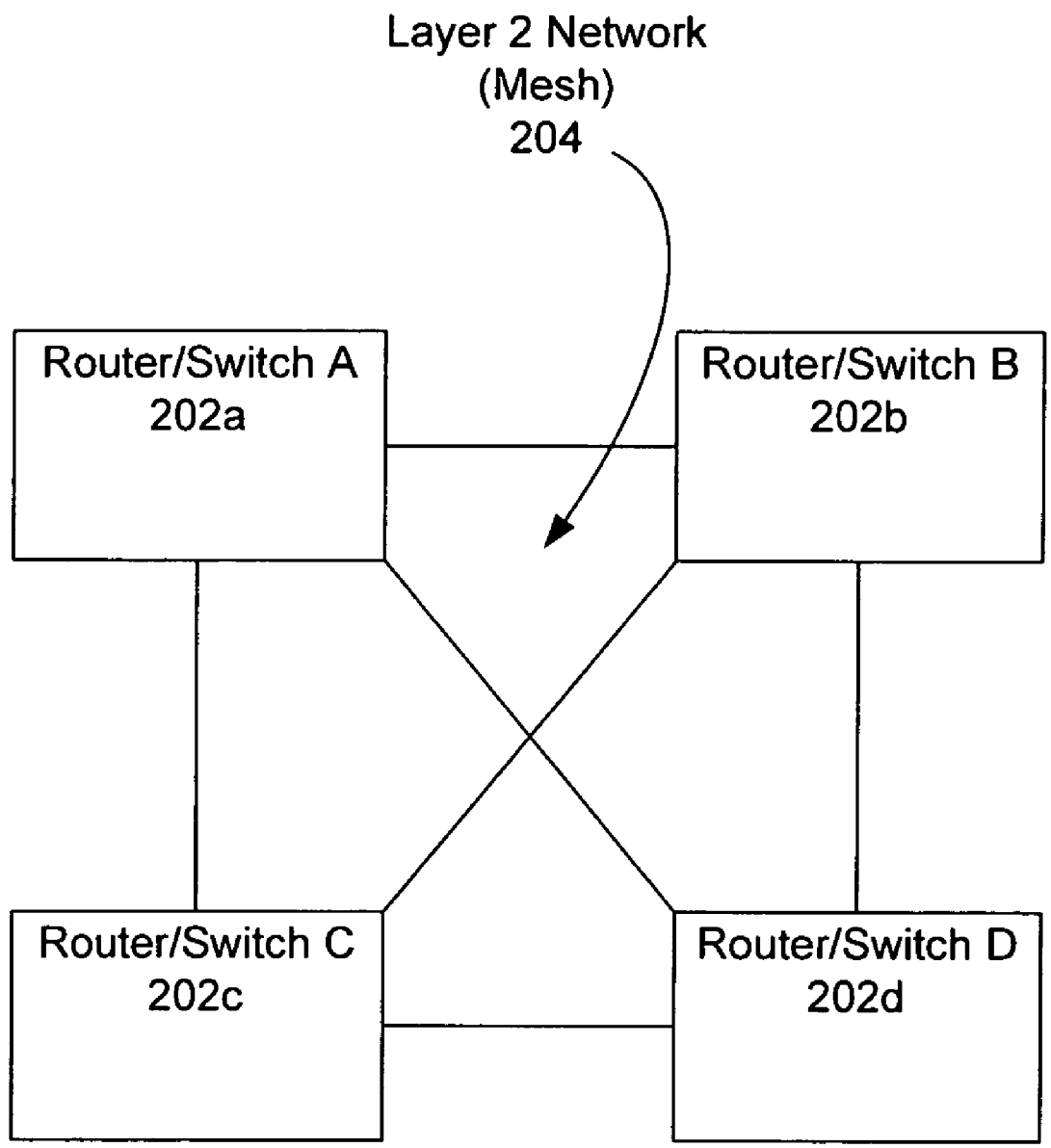
FIG. 2 is a schematic diagram depicting an example "router aggregation" including multiple router/switches in accordance with an embodiment of the invention.

FIG. 2 is a schematic diagram depicting an example "router aggregation" 200 including multiple router/switches in accordance with an embodiment of the invention. In the router aggregation, multiple router/switches 202 are interconnected with a layer 2 network 204 and configured in such a way so as to appear as one larger router.

The example depicted shows four router/switches 202, but a router aggregation 200 may include more or less than that number. As more router bandwidth and/or more router ports are needed, more router/switches 202 may be added to the router aggregation 200.

The layer 2 network 204 interconnecting the router/switches 202 of the router aggregation 200 is utilized by the router/switches 202 to share information required to keep each other informed of routing-related connections external to the router aggregation 200. In one particular embodiment, the layer 2 network 204 comprises a switch mesh. Such a switch mesh may be implemented, for example, using protocols such as those described in U.S. Pat. No. 6,580,715 ("Load Balancing Switch Protocols," inventor Ballard C. Bare) or using similar protocols. In alternate embodiments, a non-mesh layer 2 topology may also be used (for example, one utilizing the spanning tree protocol or a form thereof), but meshing has advantages with respect to load balancing and lowest latency path aspects. Regarding the use of a spanning tree protocol, single-instance spanning tree allows only a single path through the topology and so may restrict bandwidth to an extent where it may not be an appropriate lower layer to use for aggregated routing. However, multi-instance spanning tree in an appropriate configuration may be viable for aggregate routing since it allows multiple alternate paths.

If the layer 2 network 204 in the router aggregation 200 is implemented as a switch mesh, then dynamic load balancing may be advantageously provided between the links in the mesh in an automated manner based on measured link actual latency. In contrast, the path chosen using the conventional solution with multiple routers interconnected via routing protocols would typically be static based on fixed link costs configured by the user.

Furthermore, in the case of multicast routing, the aggregated router may be configured to load balance using the broadcast maps available in the meshing paradigm that would not be typically available in router-to-router links. This load balancing using broadcast maps becomes even more advantageous when multiple edge routers require the multicast traffic since the initiating router only needs to duplicate the multicast traffic only once into the mesh rather than "n" times as would be required if "n" routers joined the traffic in a router-to-router paradigm.

Figure 3A:
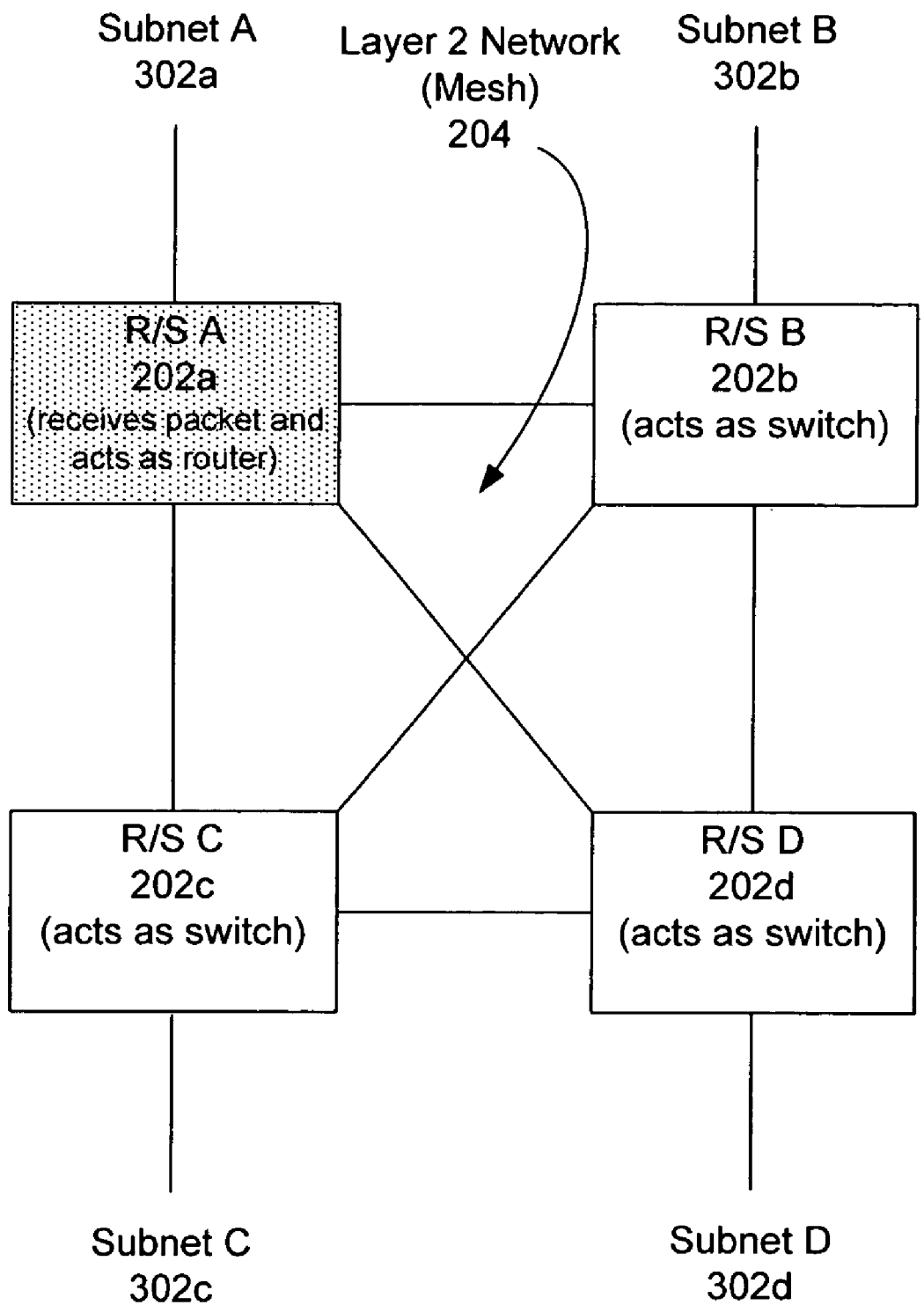
FIG. 3A is a schematic diagram depicting the functionality of the example router aggregation when a packet is initially received by router/switch (R/S) A.
Figure 3B:
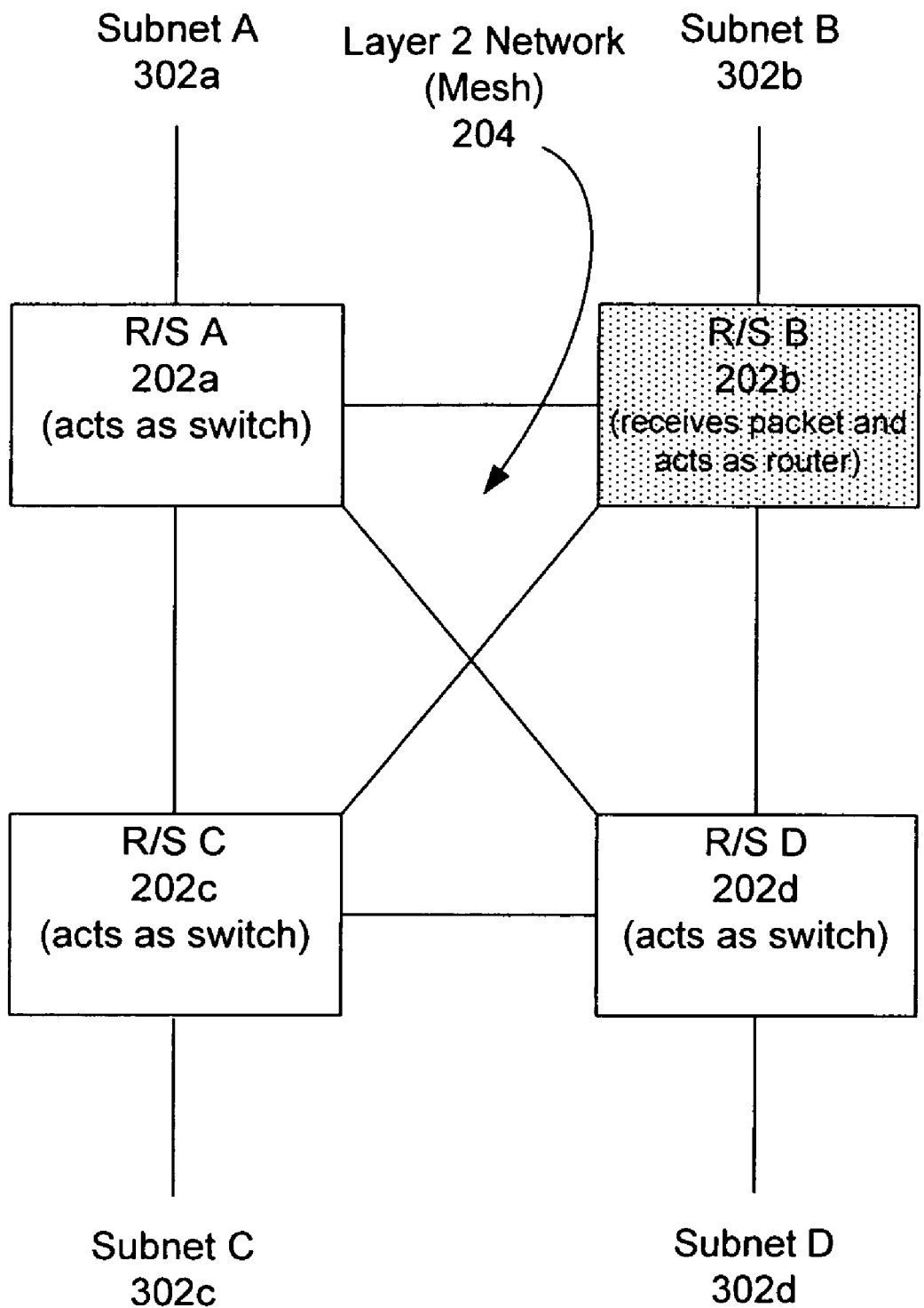
FIG. 3B is a schematic diagram depicting the functionality of the example router aggregation when a packet is initially received by R/S B.

The functionality and operation of a router aggregation is now discussed in relation to FIGS. 3A, 3B, and 4. FIG. 4 is a flow chart depicting a method 400 of routing by a router aggregation in accordance with an embodiment of the invention. FIG. 3A is a schematic diagram depicting the functionality of the example router aggregation 200 when a packet is initially received into the aggregation by router/switch (R/S) A 202a. FIG. 3B is a schematic diagram depicting the functionality of the example router aggregation 200 when a packet is initially received by R/S B 202b. In FIGS. 3A and 3B, each R/S unit 202 is shown with external links that go to different subnets 302.

First, consider the case where a packet is initially received into the aggregation by router/switch (R/S) A 202a, as shown in FIG. 3A. In this case, the R/S A 202a initially receives (402) a packet into the aggregation 200 from subnet A 302a. As the initially receiving router, R/S A 202a performs (404) the routing functions, including looking "deeper" into the packet for the destination IP address, looking-up the destination IP address in its routing table, checking any IP access control lists (ACLs), modifying the source and destination MAC addresses, decrementing IP time-to-live (TTL), and re-computing the IP header checksum, then forwarding the packet as necessary. Advantageously, these routing functions need be performed only once. When necessary, the initially receiving router, R/S A 202a forwards the packet by sending (406) the packet to the layer 2 network 204 of the aggregation 200. When the packet is received by one or more of the other R/S units (B, C, and D) 202, these other R/S units 202 merely function (408) as layer 2 switches and switches (410) the packet out of the aggregation 200 to the appropriate subnet(s) 302 using layer 2 switching techniques.

Similarly, consider the case where a packet is initially received into the aggregation by router/switch (R/S) B 202b, as illustrated in FIG. 3B. In this case, the R/S B 202b initially receives (402) a packet into the aggregation 200 from subnet B 302b. As the initially receiving router, R/S B 202b performs (404) the routing functions, including looking "deeper" into the packet for the destination IP address, looking-up the destination IP address in its routing table, checking any IP access control lists (ACLs), modifying the source and destination MAC addresses, decrementing IP time-to-live (TTL), and re-computing the IP header checksum, then forwarding the packet as necessary. Advantageously, these routing functions need be performed only once. When necessary, the initially receiving router, R/S B 202*b* forwards the packet by sending (406) the packet to the layer 2 network 204 of the aggregation 200. When the packet is received by one or more of the other R/S units (A, C, and D) 202, these other R/S units 202 merely function (408) as layer 2 switches and switches (410) the packet out of the aggregation 200 to the appropriate subnet(s) 302 using layer 2 switching techniques.

The router aggregation 200 would operate in an analogous manner if the initially receiving router was R/S C 202*c* or R/S D 202*d*. In each case, only the initially receiving router/switch 202 needs to perform routing functions. The other units 202 act as switches to forward the packet.

The above-discussed operation of the router aggregation 200 advantageously reduces the overhead and increases the performance relative to a group of routers interconnected via routing protocols. From each aggregated router's point of view, the layer 2 network (mesh) 204 is a direct connection to all of the subnets 302 that are directly connected to all its peer routers 202 in the aggregation 200.

To make router aggregation easy for a user to configure, the aggregated router 200 may be configured to appear as one large router from an external point of view. The may be implemented using a network management function that can see the entire network. Management Information Base (MIB) parameters would be included in the routers to allow the network management to discover which routers are interconnected so as to form a router aggregation 200.

Additional Protocols

In order to implement the router aggregation, at least two additional protocols may be used. One additional protocol comprises a protocol to distribute ARP information amongst the R/S units 202 of the router aggregation 200. Another additional protocol comprises a protocol to distribute routing information amongst the R/S units 202 of the router aggregation 200.

The ARP cache information is passed between the aggregated routers so that when a packet needs to be routed through the aggregation, the receiving router will know what MAC address to put as the destination into the routing packet. (If path tags are utilized, as discussed further below, then the information should also include the appropriate tag to add to the packets routed to that destination.) This MAC address could be an end host that is directly connected to any of the aggregated routers or a next hop router that is externally connected to the aggregation.

The sharing of routing information is done so that the router knows if one of the aggregated routers is directly connected to the destination subnet or if the packet must be sent to an externally connected subnet. This then determines whether a host lookup or a next hop lookup is performed in the ARP cache.

If the destination subnet is directly connected to the router aggregation and no ARP cache entry exists for the destination, then the router that needs the information (the initially receiving router) may request the address resolution information from the appropriate edge router based on the routing table information. This router in turn may either send the address resolution information if it knows the information, or it may issue an ARP request to gather the information. The ARP response is then used to provide the appropriate destination MAC address for forwarding the packet.

Propagating ARP Information

FIG. 5 is a flow chart depicting a method (500) of propagating address resolution protocol (ARP) information among R/S units 202 in a router aggregation 200 in accordance with an embodiment of the invention. When a new ARP entry is discovered (502) by any of the aggregated routers 202, the discovering router/switch propagates this information to its peers.

In one embodiment, the discovering router/switch generates (504) an ARP information packet and sends (506) that packet to the other aggregated routers so that they would enter the ARP information into their ARP caches. The ARP information packet may be preferably sent (506) by way of broadcasting or multicasting to reduce overhead. However, to ensure success, each receiving router/switch would be configured to return (unicast) (508) acknowledgement packets to the sending router/switch. If the sending router/switch receives (510) all the acknowledgements within a timeout period, then the ARP caches of the routers in the aggregation would be synchronized (512) with respect to the new entry. Otherwise, if all acknowledgements are not received within the timeout period, then the sending router/switch may retransmit (514) the ARP information individually to those router/switches that had not responded.

In addition, an aggregated router may be advantageously configured to only age out ARP entries for which it is the owner. When an aggregated router does age out an ARP entry, it should inform its peers (the other aggregated routers) that the entry is aged out. If a given edge router of the aggregate is lost (i.e. removed from the aggregate), the other aggregated router may then remove all the ARP cache entries associated with the removed router. In this manner, the ARP caches in all the aggregated routers may remain synchronized. To further assure synchronization, a periodic packet may be sent with all the ARP cache information. In the case when a router first comes up as part of the router aggregate, that new router may request a complete update from one or more of the other aggregated routers.

Note that if the layer 2 network 204 comprises a switch mesh, as in a preferred embodiment, then the router may already know the MAC addresses of its peers and could use this knowledge to determine from which routers it should expect acknowledgements. However, this information could be configured or discovered with other protocols if meshing was not utilized.

Propagating Route Information

FIG. 6 is a flow chart depicting a method of propagating route information among R/S units 202 in a router aggregation 200 in accordance with an embodiment of the invention. When a router/switch 202 at an edge of the router aggregate 200 learns (602) about a route change for its non-aggregate connected interfaces to external subnets, the learning R/S not only updates its own routing tables, but also propagates this information to its peers. Route changes may come in the form of OSPF information, or links changing state, or routes aging, and so on.

In accordance with one embodiment, in order to propagate the route change information, the learning R/S generates (604) a route change information packet and sends (606) that packet to the other aggregated routers so that they can update their routing tables. The route change information packet may be preferably sent (606) by way of broadcasting or multicasting to reduce overhead. However, to ensure success, each receiving router would be configured to return (unicast) (608) acknowledgement packets to the sending router/switch. If the sending router receives (610) all the acknowledgements within a timeout period, then the routing tables of the routers in the aggregation would be synchronized (612) with respect to the route change information. Otherwise, if all acknowledgement are not received within the timeout period, then the sending router may retransmit (614) the route change information individually to those router/switches that had not responded.

Note from each aggregated router's point of view, the layer 2 network of the aggregate appears as a directly connecting interface to all the connected subnets of its peers (i.e. of the other aggregated routers), except the only way those routes change is based on route change information packets from the peers. This routing information would be propagated outside the router aggregate using which ever routing protocols are configured for the non-aggregate ports.

VRRP Implementation

For added redundancy, routers within the aggregation may be configured using virtual router redundancy protocol (VRRP). In this case, ports connected to external subnets (i.e. non-aggregate ports) could exist on the same virtual local area network (VLAN) such that it is possible for both routers to simultaneously propagate ARP cache entries for the same IP addresses to other routers. To overcome this issue, when two edge routers in a VRRP configuration detect an ARP collision, they could reactively negotiate with each other. The winner of the negotiation may issue a new ARP inform to insure that the ARP cache of all the routers in the aggregate is synchronized. In general, it would be preferable from a load balancing perspective if the ARP entry ownership on a given subnet is divided across both routers. (This would not form a loop since all packets coming into the edge routers are routed, not bridged, into the layer 2 network of the router aggregation.) When failover occurs, the router that takes over the other routers' addresses will need to update all the ARP entries for which it is now owner. (This would include all next hop entries and local hosts on the subnet of which it has taken full control.) The router information would remain the same, only ARP to the next hop entries and the locally connected hosts change, these ARP entries in effect define the path through the layer 2 network.

Broadcasting

In accordance with one embodiment of the invention, broadcast data packets would not be sent through the switch network (mesh) of an aggregated router, although protocol packets may use broadcasts as a method to inform multiple devices at once. Multicast packets may be sent, however, in the case of multicast routing. To accommodate multicast routing, a multicast routing protocol would be enabled on all the routers that have interfaces for which multicast is enabled. The switch network (mesh) would be considered an interface for all the remote subnets from the multicasting routing protocol point of view. If a multicast flow is received by an aggregated router (or is found via other mechanisms, for example, state refresh in Protocol Independent Multicast-Dense Mode or PIM-DM), the discovered flow is propagated to all the other aggregated routers. If one of the aggregated routers has a join pending for the flow (for example, an Internet Group Management Protocol or IGMP join from a non-aggregated port), then it would issue a join request for the flow (or a unicast Graft in the case of PIM-DM) to the router that advertised the flow. This router in turn would then flood the multicast traffic into the switch network (mesh). The received traffic would then be flooded out the appropriate interfaces. In one implementation, when an initially receiving router/switch unit receives a multicast packet from outside the aggregation, the initially receiving router/switch unit performs routing functions and uses a broadcast map to send the multicast packet to all other router/switch units of the aggregation, and wherein the other router/switch units replicate and forward the multicast packet out those ports external to the aggregation where multicast joins have occurred.

In essence, multicast routing in the router aggregate acts much like conventional multicast routing across multiple routers. However, multicast routing has an advantage in that the aggregated routers may use broadcast maps to propagate multicasts through the topology, which is more efficient than using standard router-to-router links to propagate the multicasts.

Path Tags

In accordance with one embodiment of the invention, tags may be utilized to identify particular switching paths through the switch network of the router aggregate. These tags may be appended to data packets to indicate the particular path to be taken. Information as to the correspondence between tags and paths would be kept at each aggregated router.

Figure 7:
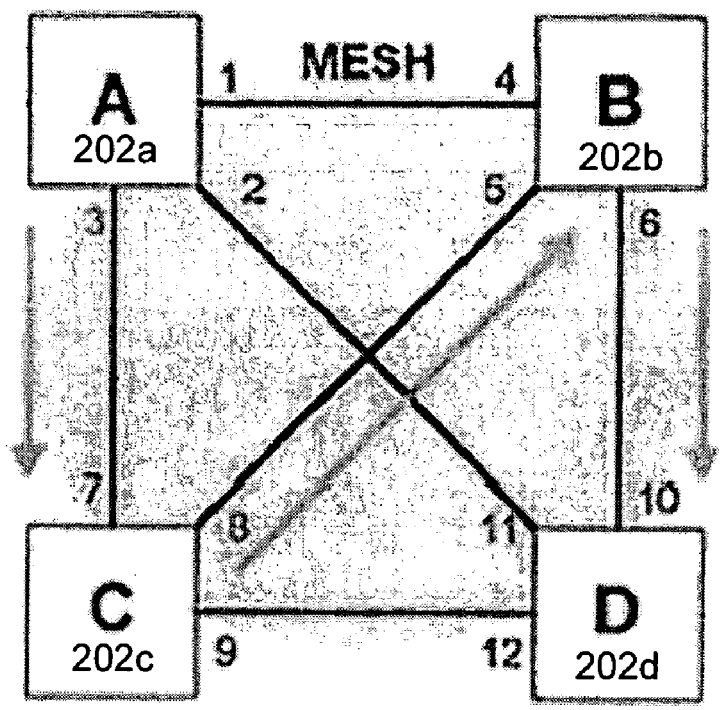
FIG. 7 is a schematic diagram depicting a switching mesh in accordance with an embodiment of the invention.

FIG. 7 is .a schematic diagram depicting a switching mesh in accordance with an embodiment of the invention. One example path 704 is shown in FIG. 7. This path 704, designated in this instance as path 0xB382, travels as follows: exits port 3 of switch A 202-A; enters port 7 of switch C 202-C; exits port 8 of switch C 202-C; enters port 5 of switch B 202-B; exits port 6 of switch B 202-B; and enters port 10 of switch D 202-D.

In accordance with an embodiment of the invention, mesh tagging is utilized to advantageously identify paths within the mesh from a source switch to a destination switch. In one implementation, each source/destination pair may be configured with up to fifteen different paths. This is because four bits are used for the path identifier in a path tag and the zero value is considered invalid in this specific implementation. One example of such a path tag is described further below in relation to FIG. 8. Other embodiments may provide a different number of broadcast paths per switch by using a different number of bits for the path identifier. For example, if the path identifier has six bits, then each source/destination pair may be configured with sixty-three different paths.

Figure 8:
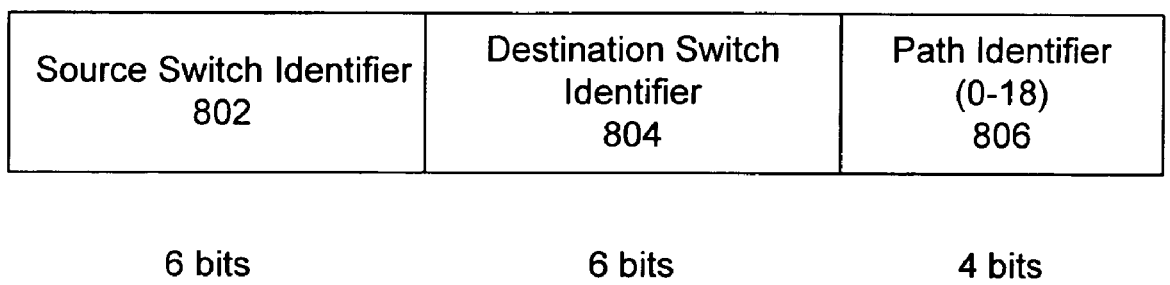
FIG. 8 is a diagram of a path tag in accordance with an embodiment of the invention.

FIG. 8 is a diagram of a path tag in accordance with an embodiment of the invention. The path tag includes a source switch identifier 802, a destination switch identifier 804, and a path identifier 806. The source switch identifier may also be called an owner switch identifier. In this embodiment, the path tag is sixteen bits in length. In particular, the source switch identifier 802 is six bits long, the destination switch identifier 804 is six bits long, and the path identifier 806 is four bits long. In this implementation, with the switch identifiers being six bits long, sixty-three different switches in the mesh may be distinguished and identified. (The value zero for the switch id being considered a reserved value in this implementation.) With the path identifier being four bits long, fifteen different paths may be identified per source/destination pair. (The value zero for the path id again being considered reserved in this implementation.) Other embodiments may have other lengths for these fields, resulting in different numbers of identifiable switches and paths.

Consider, for example, the mesh depicted in FIG. 7. Path tags of the format depicted in FIG. 8 may be used to identify different paths, for instance, from switch A to switch D. Given that source and destination, each path tag would include an identifier corresponding to switch A in the source switch identifier field 802 and an identifier corresponding to switch D in the destination switch identifier field 804. Distinctive path identifiers, one per path between A and D, would be included in the path identifier field 806.

For instance, a first path may go directly from A to D by exiting port 2 of switch A and entering port 11 of switch D. A second path may travel from A to D via switch C by exiting port 3 on switch A, entering port 7 of switch C, exiting port 9 of switch C, and entering port 12 of switch D. And so on for other possible paths. Each path is associated with a unique path identifier.

Consider the case where switch D learns a new MAC address and informs the rest of the mesh of the new MAC address associated with switch D. Switch A can then assign to that MAC address a path tag corresponding to one of the aforementioned paths from A to D (for example, path tag 0xB382 discussed above). Subsequently, every packet destined for that MAC address that enters switch A may be forwarded through the mesh based on that assigned path tag.

Conclusion

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A cooperative aggregation of router/switch units, the cooperative aggregation comprising:
   a plurality of the router/switch units;
   a switching network including and interconnecting said plurality of router/switch units,
   wherein the cooperative aggregation is configured to function as a single router from a perspective of an external network device coupled to the cooperative aggregation,
   wherein each router/switch is configured such that, if the router/switch is an initial router/switch unit that receives a packet from outside the aggregation, then the router/switch is configured to perform routing functions, including modification of the source and destination Media Access Control (MAC) addresses, with respect to the packet, and if the router/switch unit is not the initial router/switch unit in the aggregation to receive the packet, then the router/switch unit is configured to not perform routing functions with respect to the packet;
   each router/switch sharing information with the other router/switch units of the aggregation using a first protocol such that each router/switch is able to determine whether a destination Internet Protocol (IP) address for a packet is within an IP subnet that is directly or externally connected to one of the router/switches of the aggregation.

2. The cooperative aggregation of claim 1, wherein each router/switch unit comprises an Internet protocol router adapted to function as part of the aggregation.

3. The cooperative aggregation of claim 1, wherein interconnections of the switching network are configured to provide multiple paths to communicate packets between any two router/switch units.

4. The cooperative aggregation of claim 3, wherein the switching network comprises a switching mesh.

5. The cooperative aggregation of claim 1, further comprising:
   a second protocol configured to share Address Resolution Protocol (ARP) cache information between the router/switch units of the aggregation.

6. The cooperative aggregation of claim 5, wherein the ARP cache information includes cached MAC addresses for end hosts in the directly-connected subnets and cached MAC addresses for next-hop routers in the externally-connected subnets.

7. The cooperative aggregation of claim 1, wherein the routing functions include looking up a destination IP address from the packet in a routing table.

8. The cooperative aggregation of claim 7, wherein one or more of the other router/switch units are configured to perform switching with respect to that packet.

9. The cooperative aggregation of claim 1, wherein each router/switch unit is configured such that, if the router/switch unit is an initial router/switch unit that receives a multicast packet from outside the aggregation, then the router/switch unit is configured to use a broadcast map to send the multicast packet to all other router/switch units of the aggregation, and if the router/switch unit is not the initial router/switch unit that receives the multicast packet from outside the aggregation, then the router/switch unit is configured to replicate and forward the multicast packet out of ports external to the aggregation where multicast joins have occurred.

10. A method of routing a packet by way of an aggregation of router/switch units, the method comprising:
   sharing routing information between the router/switch units of the aggregation such that each router/switch is capable of determining whether a packet destination Internet Protocol (IP) address is within an IP subnet that is directly or externally connected to one of the other router/switch units of the aggregation:
   receiving a packet from outside the aggregation by an initially receiving router/switch unit;
   performing router functions by the initially receiving router unit, including modification of the source and destination Media Access Control (MAC) addresses of the packet; and
   sending the packet to a layer 2 network of the aggregation, wherein switching functions, but no router functions, are performed on the packet.

11. The method of claim 10, further comprising layer 2 switching of the packet by other router/switch units of the aggregation.

12. The method of claim 11, wherein each router/switch unit comprises an Internet Protocol router adapted to function as part of the aggregation.

13. The method of claim 10, wherein the layer 2 network provide multiple paths to communicate packets between any two router/switch units.

14. The method of claim 13, wherein the layer 2 network comprises a switching mesh.

15. The method of claim 10, further comprising: sharing Address Resolution Protocol (ARP) cache information between the router/switch units of the aggregation.

16. The method of claim 15, wherein the ARP cache information includes cached MAC addresses for end hosts in the directly-connected subnets and cached MAC addresses for next-hop routers in the externally-connected subnets.

17. An apparatus configured to route a packet as part of a an aggregation of router/switch units, the apparatus comprising:
means for sharing routing information between the router/switch units such that each router/switch unit in the aggregation is capable of determining whether a packet destination Internet Protocol (IP) address is within an IP subset that is directly or externally connected to one of the other router/switch units of the aggregation;
means for receiving a packet from outside the aggregation by an initially receiving router/switch unit;
means for performing router functions by the initially receiving router unit, including looking-up a destination internet protocol address from the packet in a routing table and modification of the source and destination Media Access Control (MAC) addresses of the packet; and
means for sending the packet to a layer 2 network of the aggregation wherein switching functions, but no routing functions, are performed on the packet.

18. The apparatus of claim 17, wherein the routing functions performed by the initially receiving router unit further include decrementing an IP time-to-live and re-computing an IP header check-sum.

19. The apparatus of claim 17, wherein the cooperative aggregation functions as a single router from a perspective of an external network device.

* * * * *

UNITED STATES PATENT AND TRADEMARK OFFICE
CERTIFICATE OF CORRECTION

| | | |
|---|---|---|
| PATENT NO. | : 8,009,668 B2 | |
| APPLICATION NO. | : 10/919760 | |
| DATED | : August 30, 2011 | |
| INVENTOR(S) | : Ballard Claude Bare et al. | |

It is certified that error appears in the above-identified patent and that said Letters Patent is hereby corrected as shown below:

In column 11, line 3, in Claim 17, delete "a an" and insert -- an --, therefor.

In column 11, line 9, in Claim 17, delete "subset" and insert -- subnet --, therefor.

Signed and Sealed this
First Day of January, 2013

David J. Kappos
*Director of the United States Patent and Trademark Office*